United States Patent
Benedict et al.

(10) Patent No.: US 11,281,833 B1
(45) Date of Patent: Mar. 22, 2022

(54) METHODS AND SYSTEMS FOR EXCHANGE BUS ROUTING

(71) Applicant: HEWLETT PACKARD ENTERPRISE DEVELOPMENT LP, Houston, TX (US)

(72) Inventors: Melvin K. Benedict, Houston, TX (US); Karl J. Bois, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/084,343

(22) Filed: Oct. 29, 2020

(51) Int. Cl.
*G06F 30/392* (2020.01)
*G06F 30/347* (2020.01)
(Continued)

(52) U.S. Cl.
CPC .......... *G06F 30/347* (2020.01); *G06F 30/392* (2020.01); *G06F 30/394* (2020.01); *G06F 30/398* (2020.01)

(58) Field of Classification Search
CPC ............. G06F 3/04164; G06F 3/04166; G06F 3/0443; G06F 3/0412; G06F 30/04184; G06F 2203/04103; G06F 3/016; G06F 30/394; G06F 3/012; G06F 1/163; G06F 3/013; G06F 30/392; G06F 2203/04111; G06F 2203/04112; G06F 2203/04105; G06F 2203/04107; G06F 11/261; G06F 2111/04; G06F 2111/20; G06F 2117/02; G06F 2203/04106; G06F 2203/04809; G06F 3/0418; G06F 3/044; G06F 3/047; G06F 30/33; G06F 12/0215; G06F 12/0246; G06F 12/0638; G06F 12/0866; G06F 12/12; G06F 2203/0384; G06F 2212/205; G06F 2212/654; G06F 2212/7203; G06F 3/002; G06F 3/0202; G06F 3/021; G06F 3/0219; G06F 3/0233; G06F 3/03543; G06F 3/03549; G06F 3/0383; G06F 3/039; G06F 3/04892; G06F 3/0613; G06F 3/065; G06F 3/0659; G06F 3/0679; H01L 2924/15311;
(Continued)

(56) References Cited

U.S. PATENT DOCUMENTS

| | | | | |
|---|---|---|---|---|
| 2014/0326495 | A1* | 11/2014 | Paniagua | H05K 1/116 174/266 |
| 2015/0003029 | A1* | 1/2015 | Okada | H01L 25/105 361/783 |
| 2015/0075844 | A1* | 3/2015 | Kim | H05K 3/0097 174/251 |

* cited by examiner

Primary Examiner — Binh C Tat
(74) Attorney, Agent, or Firm — Sheppard Mullin Richter & Hampton LLP

(57) ABSTRACT

Systems and assemblies are provided for exchanged signal routing where the characteristics of an escape route can be modified on a printed circuit board (PCB) in a manner that reduces crosstalk and realizes significant signal quality improvement. Exchanged signal routing techniques involve "exchanging" the signal routing lanes on the PCB, which reduces coupled signal amplitude and phase relationship. Exchanged signal routing techniques can also be applied to other areas on a PCB (e.g., other than escape routes) where space is constrained and other mitigation techniques are not possible. A printed circuit board (PCB) can include an array of contact pads, a plurality of signal lines that include an escape route. One or more exchange junctions disposed within the escape route can route a first signal line of a first routing channel in the escape route into a second routing channel in the escape route.

15 Claims, 5 Drawing Sheets

(51) Int. Cl.
*G06F 30/398* (2020.01)
*G06F 30/394* (2020.01)

(58) Field of Classification Search
CPC . H01L 29/7869; H01L 27/2481; H01L 24/20;
H01L 27/14665; H05K 5/0021; H05K
1/0218; H05K 1/023; H05K 1/0248;
H05K 1/14; H05K 1/186; H05K
2201/0723; H05K 2201/09263; H05K
2201/10022; H05K 2201/10098; H05K
2201/10159; H05K 2203/1572
USPC .................................................. 716/126–131
See application file for complete search history.

METHODS AND SYSTEMS FOR EXCHANGE BUS ROUTING

DESCRIPTION OF RELATED ART

Escape routing generally refers to a pattern and method used to route the input/output (I/O) pads or solder bumps on a die (or package) to the lines that can escape to the area surrounding the die to be routed out of the package or its immediate surroundings. Particularly with circuits that implement memory circuits that use double data rate (DDR) and quadruple data rate (QDR) standards, the integrated circuits (IC) chips often require high frequency data transmission links that provide low bit error rate (BER), high bandwidth and low on-chip latency.

Accordingly, escape routing techniques for printed circuit boards (PCBs) that implement memory circuits must take into account such factors as: increased package size; increased channel bandwidth; smaller signal levels; and decreased via/pad spacing. These memory related factors are additional to other more general factors that are frequently design considerations in conventional escape routing techniques, such as: ball pitch; land diameter; number of I/O pins; via type; pad size; trace width/spacing; and the number of layers required to escape the PCB.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Various embodiments described herein are directed to improved escape routing techniques for printed circuit boards (PCBs) implementing electronics that require high data rate channel buses, such as double data rate 5 (DDR5) memory modules. According to the embodiments, multiple physical characteristics of the escape route can be modified on the PCB in a manner that can reduce crosstalk and realize significant signal quality improvement. In detail, the improved escape routing techniques involve "exchanging" the signal routing lanes on the PCB, which reduces coupled signal amplitude and phase relationship. The various mechanisms and techniques of the disclosed embodiments may be referred to herein as exchanged signal routing. Furthermore, although the disclosed exchanged signal routing techniques are described with respect to escape routing for purposes of discussion, it should be appreciated that the disclosed techniques can be also be applied to areas on a PCB where space is constrained and other mitigation techniques are not possible. In other words, escape routing is one example of a practical application for the disclosed exchange signal routing techniques.

Figure 1A:
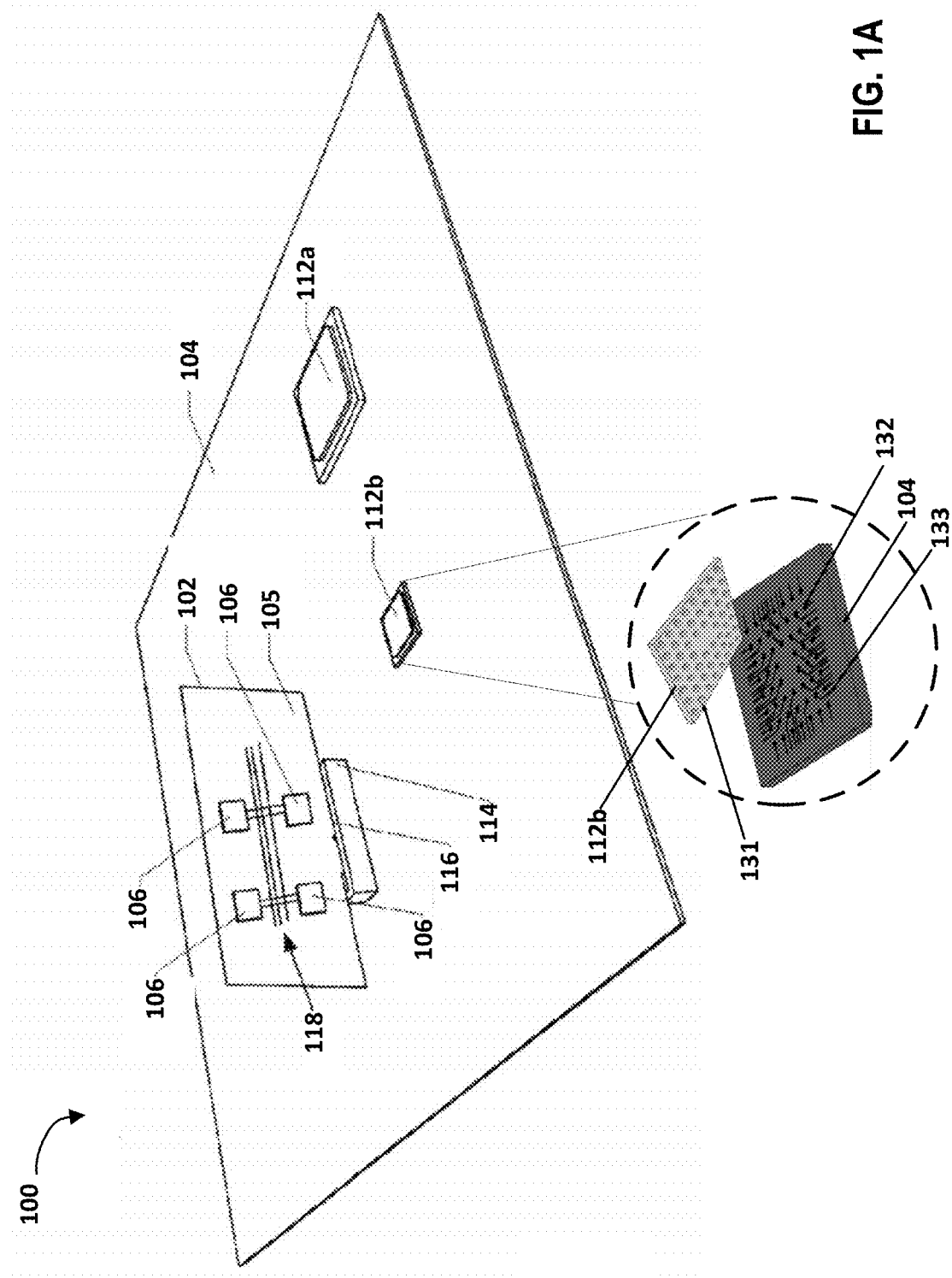
FIG. 1A is a diagram of a printed circuit board (PCB) that can implement the disclosed exchanged signal routing techniques for improved escape routing, according to some embodiments.

FIG. 1A shows an example configuration for a PCB 104 where the disclosed exchanged signal routing can be employed. As referred to herein, a PCB is a structure that mechanically supports and electrically connects electrical (or electronic) components using conductive tracks, pads and other features etched from sheet layers of conductive material (e.g., copper) laminated onto and/or between sheet layers of a non-conductive substrate. Although PCBs are discussed herein for purposes of illustration, it should be appreciated that the disclosed techniques can be applied to other types of electrical circuitry elements, such as printed circuit assemblies (PCAs), printed circuit board assemblies (PCBAs), circuit card assemblies (CCAs), and the like. In the example, the PCB 104 has circuitry to implement an electronic device 100 including a DDR5 memory module 102. As background, electronic devices typically contain memory for storing data and software instructions. Such memory can be provided between secondary storage (usually implemented with a disk-based storage device) and a central processing unit (CPU) of the electronic device. The memory can be implemented with dynamic random access memories (DRAMs), for example. There are various types of DRAMs, including synchronous DRAMs (SDRAMs) and double data rate (DDR) DRAMs (defined by standards set by JEDEC). The original DDR SDRAM standard has been superseded by later established standards, such as DDR5.

In the illustrated example, the PCB 104 can be configured to include high data rate channels. High data rate channels are often required for memory modules, such as a DDR5, to function optimally. For example, as a DDR5 memory, the memory module 102 can support data rates of approximately mega-transfers-per second (MT/s) with a fundamental frequency content of 2400-3200 MHz, thereby having increased performance and bandwidth. In order to accommodate such high data rate channels on the PCB 104, the disclosed exchanged signal routing techniques can be used as a form of improved escape routing. Channels on the PCB 104 may be especially impacted by the particular type of escape routing that is employed, since (as opposed to other signals) DDR5 channels buses are often required to be routed with minimal skew. For instance, escape routing on a PCB with high data rate channels, such as a PCB 104, may be impacted by multiple factors in the chips' design, including but not limited to:

1) increased package size, lengthening the channel escape routes from under the package;
2) increased channel bandwidth, lowering signal to noise ratio, increasing channel losses, and increasing lane to lane coupling; and
3) decreased via and pad spacing, moving traces closer together.

Also, FIG. 1A depicts that the PCB 104 can include multiple components 112a, 112b, also referred to herein as devices (e.g., processors, input/output controllers, memory controllers, bridge devices, etc.) that are mounted on a surface of the PCB 104. The PCB 104 can also include a connector 114 of the memory module 102. As shown, the memory module 102 is implemented as a dual in-line memory module (DIMM), which may be designed for use by PCs and servers. A DIMM can be made up of a series of dynamic, random-access memory integrated circuits (ICs). These modules are mounted on the PCB 104 via the connector 114, which is illustrated as a DIMM connector (having an vertical orientation). One function of the DIMM connector 114 is to stably hold the DIMMs once mounted, and route signals vertically between ICs (on the DIMM) and PCB 104. In some cases, the connector 114 may be connected to the PCB 104 via an interposer or packaged using a ball grid array (BGA).

As shown, the memory module 102 may be mounted in the connector 114, which includes a mechanical system such as a cavity in which an IC fits and a retention chip or a lever system for holding IC in place. Although the memory module 102 is described as a DDR5 memory module for purposes of illustration, it should be appreciated that the memory module 102 can be another type of memory module, such as a DDR SDRAM, DDR2, DDR3, DDR4, or a memory module having multiple DRAMs. Accordingly, exchanged signal routing is applicable to various types of technologies having high data rate channels that are implemented on circuit boards, such as a PCB. Memory channels, as disclose above, serve as an example of a specific technology which benefits from the disclosed techniques.

The memory module 102 can include memory devices 106 that are mounted to a first surface 105 of the memory module 102. The memory module 102 further has an opposite surface (on the other side of the memory module 102 that is not visible in the view of FIG. 1A) on which additional memory devices can be mounted. The memory devices 106 can include packaging, e.g., flip-chip packaging, that provides an array of pins (or terminals) for electrical connections. Data input into a memory device 106 can be stored in memory cells of that memory device. In one example, the memory devices 106 can have a x4 data pin configuration (in which four data pins are used). The data pins of the memory devices 106 can be interconnected by conductive lines 118 on the memory module 102. The conductive lines 118 can be implemented as conductive traces on the memory module 102.

As alluded to above, the DDR5 may require the PCB 104 to have high density electrical traces around the connector 114 for the IC implementing the memory module 102. In the illustrated example, some of the traces in the PCB 104 may need to route signals that exit on one side of the component 112b (shown as an IC chip) to connect to the connector 114 on the opposite side of the PCB 104. Thus, the PCB 104 may need many layers to route traces that cross under the IC of the component 112b and the connector 114. As an example, the component 112b can be implemented as an IC chip device (e.g., CPU) having an ASIC with an associated chip substrate. Under the ASIC for the component 112b may be a socket (not shown). The combination of the packaged chip and potential socket for the device 112b, can then be assembled to the PCB 104. A close-up (indicated by dashed circle) illustrating a mounting side of the ASIC (or IC chip) implementing the component 112b is shown.

As seen in the close-up section of FIG. 1A, the component 112b can be a surface-mount package with one side (e.g., mounting side) of the package having an array of pads 131 (I/O contacts) on its bottom surface, where each pad has a solder ball attached thereto. Bottom pads 131 (e.g., on the BGA) can be arranged in a pattern matching the pattern of pads 132 on the PCB 104. The pattern of bottom pads 131 may match the pattern of top pads 132 on the PCB 104, such that the bottom pads 131 of the packaging can be directly connected to corresponding top pads 132 of the PCB 104 by vertical conductive vias. In some cases, the pattern of bottom pads 131 may include a scaling to a larger pitch or contact size than used for pads 132 on the PCB 104, or may be different from the pattern of pads 132. In particular, top pads 132 of the PCB 104 that are adjacent to each other may respectively be connected to bottom pads 131 that are adjacent, thereby causing their respective connecting vias to also be adjacent. The array of pads 131 (or contacts) make electrical connections to respective pads in an array on the PCB 104, and a conductive network of vias, traces, or other electrical routings that connect top contacts to bottom contacts. In this example, escape routing can be implemented using a pattern of signal lines beneath the component 112b routed out of its immediate surroundings, in adjacent layers between the connector 114 and the component 112b on the PCB 104.

The routes for electrical traces on the PCB 104 can start under device 112b for the disclosed techniques. The routes can then propagate to the connector 114, thereby connecting the device 112b to the memory module 102 (i.e., DIMM). In other words, the exchanged signal routing techniques disclosed herein can be applied to routes that flow from device 112b to the connector 114 of the memory module 112 (i.e., DIMM), and it is in that region of the PCB 104 where the exchanged signal routing occurs.

As alluded to above, routing of signals from beneath the component 112b can provide routings to the ICs of the memory module 102, and to devices 112a on the other side of the PCB 104. For example, signal lines 133 routed in between an IC package (or socket) layer and a PCB 104 can escape outside the footprint of the IC chip packaging (or outside the main chip cavity) for the component 112b. As will be described in further detail, the signal lines 133 on the PCB 104 may be arranged as multiple pairs of signal lines (e.g., two signal lines running parallel to each other) that are particularly routed to travel along the same channel (either above or below) around adjacent pads 132 in a layer, as an escape route. The exchanged signal routing techniques, as disclosed herein, can involve physically exchanging signal lines 132 from one routing channel (e.g., running in a layer below a pad) to another routing channel (e.g., running in a layer above the pad) for a partial length of the escape route. Further details of the disclosed exchanged signal routing techniques for improved escape routing are shown and described in reference to FIG. 3-FIG. 4.

Furthermore, the device 112b, can be an IC that is socket-mounted on the PCB 104, which communicates to other devices (e.g., device 112a) through electrically conductive traces formed in and on the PCB 104. With respect to routing, the area of the PCB 104 under the device 112b and the connector 114 for memory module 102 may provide space for electrical traces or routings that may extend beyond the boundaries of their respective ICs. Accordingly, the exchanged signal routing techniques can be implemented in spaces of the PCB 104 having electrical traces connecting the device 112b to other devices, such as an escape route between the device 112b and the memory module 102.

Figure 1B:
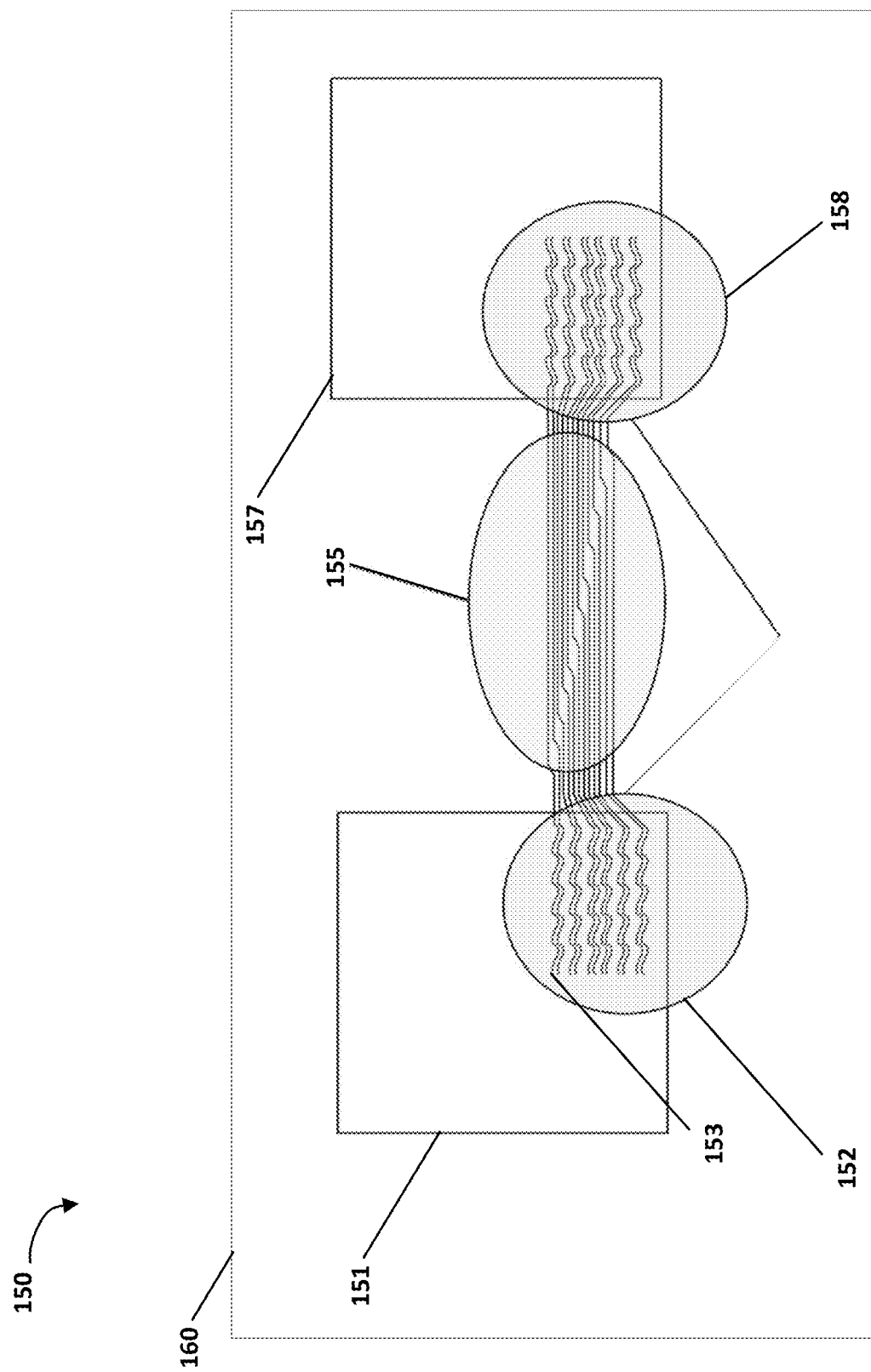
FIG. 1B is a diagram of an application specific integrated circuit (ASIC) to ASIC architecture that can implement the disclosed exchanged signal routing techniques, according to some embodiments.

FIG. 1B depicts an example of another circuitry configuration 150, shown as ASIC 151 to ASIC 157, in which the disclosed exchanged signal routing techniques can be implemented. Particularly, FIG. 1B shows that the exchanged signal routing techniques can be implemented in a constrained open field section of the PCB (as opposed to an escape route from beneath a socket, IC chip, and the like, as shown in FIG. 1A). In the illustrated example of FIG. 1B, a first ASIC 151 and a second ASIC 157 are shown to be disposed on distal ends of a circuit substrate, shown as PCB 160. Further, close-up views (indicated by circles) illustrate the multiple electrical traces, or signal lines 153, that can be routed from the areas on the PCB 160 where the ASICs 151, 157 are mounted. Specifically, the signal lines 153 are routed as electrical traces that connect ASIC 151 on one side of the PCB 160 to ASIC 157 on the opposing end of the PCB 160. Also shown, is a constrained open field 155 section of the PCB 160. As seen, the constrained open field 155 is a section of open space on the PCB 160 in between the ASICs 151, 157. The signal lines 153 are routed through the constrained open field 155 such that that form electrical traces which connect the ASICs 151, 157 on the board. For example, the signal lines 153 can be described as running from the ASIC 151 (on the left side of PCB 160) through the constrained open field 155 and terminating at the ASIC 157 (on the right side of PCB 160), or vice versa.

In this configuration, the disclosed exchanged signal routing techniques can be implemented within the constrained open field 155 on the PCB 160. As will be described in further detail, the signal lines 153 on the PCB 160 may be arranged as multiple pairs of signal lines (e.g., two signal lines running parallel to each other) as they traverse the constrained open field 155. Consequently, by applying exchanged signal routing to the signal lines 153 approximately for the length of the traces through the constrained open field 155, the pairs of signal lines 153 can be decoupled in a manner that spreads out an accumulation of the coupled signal, and reduces crosstalk. Additionally, by applying exchanged signal routing to the signal lines 153 in the constrain open field 155 area an phase change is introduces to the signals that offsets any accumulation (from interaction of the signal line pairs) on the signal lines 153 up to that point.

Figure 2:
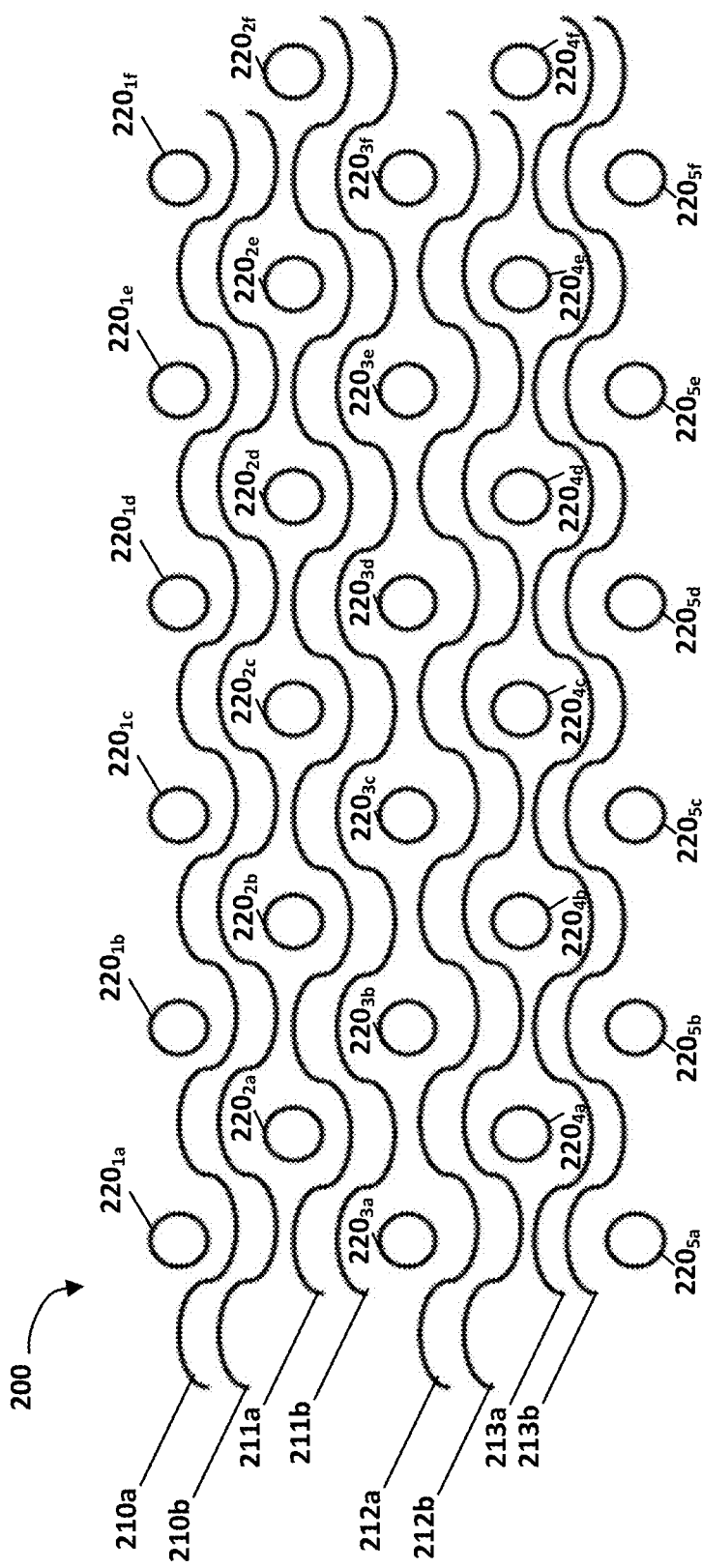
FIG. 2 is an example of a conventional escape routing pattern.

FIG. 2 depicts a portion of a typical escape routing pattern 200 that can be arranged on a substrate, such as a PCB (shown in FIG. 1A). The vertical columns of the pattern 200 can represent "layers" of semi-conductive components mounted on the PCB (e.g., BGA, sockets, ICs, etc.), and the horizontal can represent "rows" that run along the horizonal plane of the PCB, which is also referred to herein as the "length" of the escape routing pattern 200. Also shown, is an array of various contact points $220_{1a}$-$220_{5f}$ which represent a pattern of solder balls, vias, or conductive pads, on the corresponding IC packaging or substrate. In some cases, the array of contact points $220_{1a}$-$220_{5f}$ is configured to match (in number and shape) the corresponding pattern of pads (or balls) on the IC package to which it will be mounted.

As can be seen, signal lines 210a-213b (also referred to as "metal traces" or "trace") exit from the periphery contacts $220_{1a}$, $220_{2a}$, $220_{3a}$, $220_{4a}$, and $220_{5a}$ (on the right side) and contacts $220_{1f}$, $220_{2f}$, $220_{3f}$, $220_{4f}$, and $220_{5f}$ (on the left side) that are adjacent the outer edges of the escape routing pattern 200. More particular, the signal lines 210a-213b are arranged into pairs at each layer of the pattern 200. Further, these pairs of signal lines run parallel to each other, traversing the same route across the full length of the escape routing pattern 200. For instance, in the illustrated example, signal lines 210a, 210b are positioned parallel to each other (with signal line 210a directly above signal line 210b), being routed horizontally along the first row (or layer) of the pattern 200, between contacts $220_{1a}$, $220_{1b}$, $220_{1c}$, $220_{1d}$, $220_{1e}$, and $220_{1f}$ and $220_{2a}$, $220_{2b}$, $220_{2c}$, $220_{2d}$, $220_{2e}$, and $220_{2f}$. Restated, signal lines 210a, 210b traverse the same path for the entire length of the escape route routing pattern 200, running in parallel with each other in a routing channel beneath contacts $220_{1a}$, $220_{1b}$, $220_{1c}$, $220_{1d}$, $220_{1e}$, and $220_{1f}$ and above the contacts $220_{2a}$, $220_{2b}$, $220_{2c}$, $220_{2d}$, $220_{2e}$, and $220_{2f}$. Also, a pitch (i.e., distance between centers of pads) is the same in both the horizontal and vertical directions, though this need not be the case. In some cases, the number of traces that can exit through a layer depth (n=1) is limited by the pitch, the pad dimension, and the trace width. Thus, in some embodiments, there may be more than two signal lines that are run in parallel through each layer (or row) in the pattern 200.

With the pairs of signal lines 210a, 210b; 211a, 211b; 212a, 212b; and 213a, 213b being routed together (in parallel) through a routing channel (or row), there is some coupling between the signal lines in each of the pairs. Generally, as the length (e.g., distance and/or time) of coupling between the signal line pairs 210a, 210b; 211a, 211b; 212a, 212b; and 213a, 213b increases, the amount of interference between the signals similarly increases. Consequently, a substantially large amount of interference, or crosstalk, may be accumulated on the signal lines, due to the signal line pairs 210a, 210b; 211a, 211b; 212a, 212b; and 213a, 213b being coupled together for the full length of the escape route in this pattern 200. Also, this pattern 200 for escape signal routing can cause a large coupled signal amplitude to be accumulated on the routing channels, which can degrade quality of the signal (e.g., low signal to noise ratio, increased channel losses). Accordingly, conventional escape routing techniques, as shown in FIG. 2, are particularly non-optimal for circuitry requiring high data rate channels to be implemented on the PCBs, such as the DDR5 memory circuitry (shown in FIG. 1A).

To achieve escape routing, it is common for the outer rows (for example, two to four of the outer rows) within the array to contain all pins that require escape routing. The number of metal traces on the PCB that can be routed between adjacent contacts is limited, however, by the width of the traces, the size (e.g., diameter) of the contacts, and the design rules associated therewith. Thus, as the interconnect complexity of modern PCBs (and IC packages) increases, it has become increasingly difficult to route traces from the internal contacts of the array while still achieving suitable design tolerances for number of traces that can reasonably fit between adjacent contacts. As the number of pins in ICs increases, the number of rows and layers required for escape routing increases non-linearly. Even further, complex IC designs can cause many IC package sizes to increase, lengthening the channel escape routes from under the package. These aforementioned challenges can be intensified by the implementation of high data rate channels on PCBs, particularly in DDR technology. Accordingly, the disclosed exchanged signal routing techniques can realize an improvement over conventional escape routing techniques, such as pattern 200, by exchanging signal lines from one routing channel to another, thereby decoupling signal lines pairs along some portion(s) of the escape route length (e.g., reducing the length of coupling of signal lines).

Figure 3:
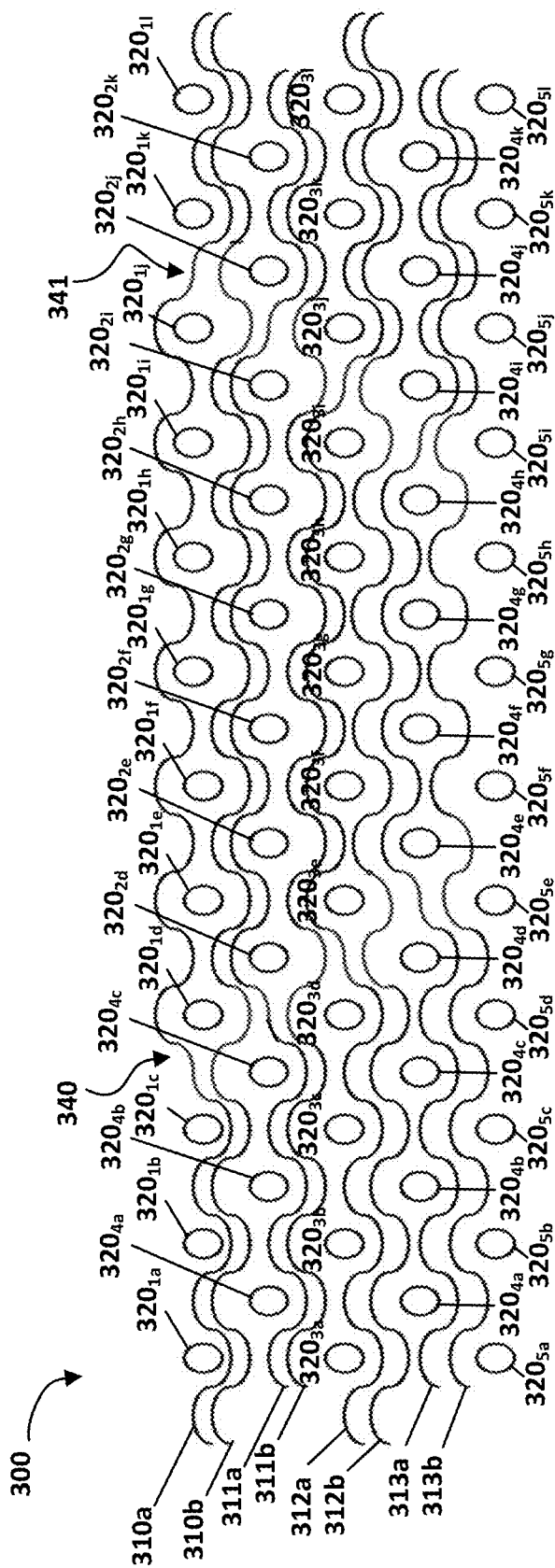
FIG. 3 is an example of an improved escape routing pattern that can be implemented in the PCB of FIG. 1A including an example of an exchanged signal routing technique, according to some embodiments.

FIG. 3 depicts a portion of an escape routing pattern 300 that can be arranged on a substrate, such as a PCB (shown in FIG. 1A), implementing the disclosed exchanged signal routing techniques. As an example, the PCB can include a plurality of component interface fields, which comprises the plurality of component contact pads $320_{1a}$-$320_{5f}$. The plurality of signal lines that includes 310a, 310b; 311a, 311b; 312a, 312b; and 313a, 313b can be disposed on the PCB, having a first end that is connected to one of the contact pads $320_{1a}$-$320_{5f}$ and a second end connected to a system interface bus of the PCB. In designing an electrical trace layout for the PCB including the escape routing pattern 300 comprising the plurality of signal lines and the one or more exchange junctions for each of the signal line pairs.

Similar to FIG. 2, contacts $320_{1a}$-$320_{5f}$ (also referred to as contact pads) represent a pattern of solder balls, or conductive pads, on the corresponding IC packaging or substrate. Also, signal lines 310a-313b exit from the periphery contacts $320_{1a}$, $320_{2a}$, $320_{3a}$, $320_{4a}$, and $320_{5a}$ (on the right side) and contacts $320_{1l}$, $320_{2k}$, $320_{3l}$, $320_{4k}$, and $320_{5l}$ (on the left side) that are adjacent the outer edges of the escape routing pattern 300. Also, the pairs of signal lines 310a, 310b; 311a, 311b; 312a, 312b; and 313a, 313b are initially routed together (in parallel) through a specific routing channel (or row). For instance, signal line pair 310a, 310b run in parallel in the row beneath contacts $320_{1a}$, $320_{1b}$, $320_{1c}$ for a portion of the escape route. Thus, there is some coupling between the signal lines in each of the pairs for this duration. However, in contrast to the escape route in FIG. 2, signal line pairs are rerouted and do not continue to run in parallel (e.g., coupled) with each other in the same routing channel for the entire length of the escape routing pattern 300. That is, according to the embodiments, one signal line of the pair is "exchanged" from its initial routing channel and ran through a different routing channel, while the other signal line continues on the same path. In other words, the "exchanged" signal line within the pair is re-directed from its current channel to another routing channel, thereby decoupling the pair of signal lines for this duration of separation. Due to this exchanged signal route, and decoupling of the signal line pairs for any length of the escape route, the coupled signal amplitude is reduced and phase relationship of the coupled signal is spread reducing the accumulated amplitude. This also reduces the coupling length for individual aggressors, which reduces the crosstalk and limits the frequency content of the coupled signals. Further, positions 340 and 341 in the escape route length can represent "exchange junctions" in the escape routing pattern 300, which can be described as points of offset (or transition) of the "exchanged" signal lines.

In the illustrated example, at a first position 340 in the escape routing pattern 300, a signal line in pairs 310a, 310b; 311a, 311b; 312a, 312b; and 313a, 313b are "exchanged." In detail, signal line 310a is re-routed to run along a different routing channel (in the layer) above contact $320_{1d}$, while signal line 310b continues to run along the initial routing channel below contact $320_{1d}$. Signal line 310a continues along this "exchanged" routing channel in the adjacent layer as its traverses contacts $320_{1d}$-$320_{1j}$. As alluded to above, the signal line pairs 310a, 310b are decoupled for this section of the escape routing pattern 300. The signal line 310a returns back to the initial routing channel at a second position 341, running beneath contacts $320_{1k}$-$320_{1l}$, and again in parallel with signal line 310b.

Also, signal line 311a is re-routed to run along a different routing channel (in the layer) above contact $320_{2d}$, while signal line 311b continues to run along the initial routing channel below contact $320_{1d}$. Signal line 311a continues along this "exchanged" routing channel in the adjacent layer as its traverses contacts $320_{2d}$-$320_{2j}$. As seen, the "exchanged" signal line 311a is then caused to run parallel with the non-exchanged signal line 310b in the same layer. Further, signal line 311a returns back to the initial routing channel at a second position 341, running beneath contacts $320_{2k}$-$320_{2l}$, and again in parallel with signal line 311b. The exchange of signal line 311a illustrates that the disclosed techniques cause a decoupling of a signal line from its initial signal line pair, and established a new coupling to another signal line in the pair of an adjacent layer for a phase (also referred to herein as "modification of coupled signal phase"). This decoupling-recoupling effect adds a second period to the via crosstalk term, reducing the peak accumulated via crosstalk by changing the phase relationship of the accumulated coupled signal, and the peak accumulated signal will be reduced. Moreover, the modification of coupled signal phase reduces the accumulated crosstalk, spreading the accumulation, and reducing the peak crosstalk.

Although not described in detail, FIG. 3 similarly shows that signal lines 312a, and 313a can be "exchanged" in the same manner described above. Implementing the disclosed exchanged signal routing techniques, shown in the escape routing patter 300, can result in an estimated reduction coupling by 50% for the same Nyqyist frequency. It should be understood that due to the use of re-routed, or "exchanged" routing channels, the disclosed techniques may require an occasional added routing channel (e.g., 1 added routing channel per 16 lanes on a given layer). Nonetheless, the resulting improved signal to noise ratio, increases the reliability and information carrying capacity of the channel, which are both important characteristics in platforms developed to high performance/high data rate applications, such as As a Service (AaS) applications and DDR5.

Figure 4:
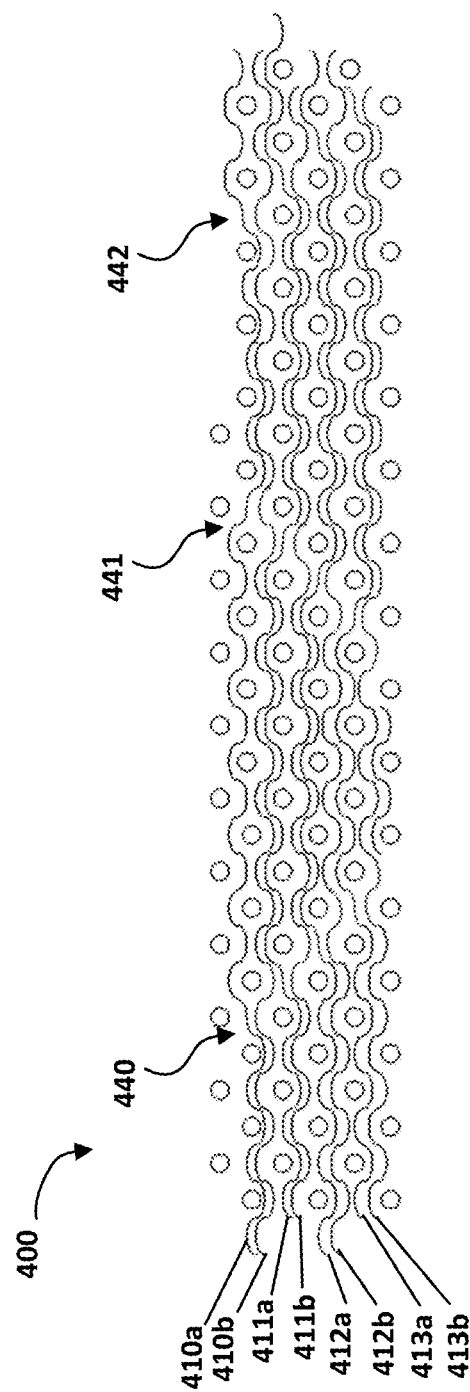
FIG. 4 is another example of an improved escape routing pattern that can be implemented in the PCB of FIG. 1A including another example of an exchanged signal routing technique, according to some embodiments.

For instance, FIG. 4 shows another example of a portion of an escape routing pattern 400 that can be arranged on a substrate, such as a PCB (shown in FIG. 1A) that implements the disclosed exchanged signal routing techniques. Particularly, the pattern 400 includes three exchange junctions 440, 441 and 442 along the length of the escape routing pattern 440. In this example, the signal lines 410a, 411a, 412a, 413a are "exchanged" to a different routing channel in an adjacent layer, as described above, at position 440. Then, the signals lines 410a, 411a, 412a, 413a are transition again, returned to their initial routing channel in their layer of origin at position 441. However, this pattern 400 performs another "exchange" of the signal lines 410a, 411a, 412a, 413a at position 442. Therefore, in comparison to the escape routing pattern in FIG. 3 (assuming the same length of the escape route), the pattern 400 allows the signal lines to be "exchanged" for a smaller portion of the escape route length (e.g., shorter distance between exchange junctions). In turn, the pattern 400 allows the frequency of the exchange of to be increased.

FIG. 4 serves to illustrate that in accordance with the exchanged signal routing techniques, the placement of the exchange junctions in the escape route, which sets the spacing between offsets (or transitions) of the exchanged signal lines can be varied based on the specific application or a desired amount of crosstalk reduction. As a general concept, it should be understood that shortening the spacing between "exchange" positions of the signal lines, in turn increases the coupling reduction. For example, a total number of exchange junctions to be used within an electrical trace layout can be determined, and variably adjusted as a design choice prior to fabricating the PCB. The total number exchange junctions in the electrical trace layout (e.g., escape route portion of the PCB) can govern a length of coupling between the signal lines within a respective signal line pair. That is, at each exchange junction, the signal line pair is decoupled by having a signal line that is "exchanged" to an adjacent channel. Generally, the total number of exchange junctions has an inversely proportional relationship to a length of coupling of a signal line pair. For instance, increasing the total number of exchange junctions in an escape route yields a decrease in the length of coupling of the lines in a signal line pair.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A device comprising:
   a printed circuit board (PCB) comprising an array of contact pads for coupling to a ball grid array (BGA) device, wherein the array comprises a plurality of rows and a plurality of columns;
   a plurality of signal lines disposed on the PCB, wherein a portion of the plurality of signal lines comprise an escape route on the PCB;
   the escape route configured into a plurality of routing channels, wherein each of the plurality of routing channels comprises a pair of signal lines, and wherein each routing channel is positioned between a corresponding first row of the array of contact pads and a second row adjacent to the first row; and
   one or more exchange junctions disposed within the escape route, wherein a first exchange junction is configured to route a first signal line of the pair of signal lines within a first routing channel in the escape route into a second different routing channel in the escape route for a predetermined length, wherein routing the first signal line from the first routing channel to the second routing channel decouples the first signal line of the pair of signal lines from a second signal line of the pair of signal lines, and wherein decoupling the first signal line from the second signal line introduces a phase shift corresponding to the predetermined length.

2. The device of claim 1, wherein the first signal line and the second signal line of the signal line pair are coupled and routed together within the first routing channel for a portion of the escape route before the one or more exchange junctions.

3. The device of claim 1, wherein the one or more exchange junctions further comprise a second exchange junction configured to route the first signal line from the second routing channel back to the first routing channel.

4. The device of claim 3, wherein the second routing channel is adjacent to the first routing channel.

5. The device of claim 3, wherein routing the first signal line from the second routing channel back to the first routing channel recouples the first signal line to the second signal line of the pair of signal lines.

6. The device of claim 1, wherein a total number of the one or more exchange junctions disposed within the escape route is variable, and adjusts the length of the escape route corresponding to routing the first signal line in the second routing channel.

7. The device of claim 1, wherein the plurality of pairs of signal lines comprise high data rate signal lines.

8. The device of claim 1, wherein the PCB comprises an integrated circuit (IC) implementing a device comprising high data rate channel buses.

9. The device of claim 8, wherein the device comprises a double data rate (DDR) memory module.

10. A printed circuit board (PCB), comprising:
    an array of contact pads for coupling to a ball grid array (BGA) device, wherein the array comprises a plurality of rows and a plurality of columns;
    a plurality of signal lines disposed on the PCB, wherein a first portion of the plurality of signal lines traverse a constrained open field on the PCB, and wherein a second portion of the plurality of signal lines traverse a region on the PCB occupied by the array of contact pads;
    wherein the second portion of the plurality of signal lines comprises an escape route, the escape route configured into a plurality of routing channels, wherein each of the plurality of routing channels comprises a pair of signal lines, and wherein each routing channel is positioned between a corresponding first row of the array of contact pads and a second row adjacent to the first row; and
    one or more exchange junction disposed within the escape route and configured to route a first signal line of the pair of signal lines in a first routing channel into a second different routing channel for a predetermined length, wherein routing the first signal line from the first routing channel to the second routing channel decouples the first signal line of the pair of signal lines from a second signal line of the pair of signal lines, and wherein decoupling the first signal line from the second signal line introduces a phase shift corresponding to the predetermined length.

11. The PCB of claim 10, wherein moving the first signal line from the first routing channel decouples the first signal line of the pair signal lines from a second signal line of the pair of signal of lines within the first routing channel.

12. A method, comprising:
    determining one or more exchange junctions between a first signal line and a second signal line of a plurality of signal line pairs;
    designing an electrical trace layout for a printed circuit board (PCB) including a pattern comprising the plurality of signal line pairs and the one or more exchange junctions for each of the signal line pairs, wherein the PCB comprises an array of contact pads for coupling to a ball grid array (BGA) device, wherein the array comprises a plurality of rows and a plurality of columns, wherein at least a portion of each signal line pair is routed in a corresponding routing channel positioned between a first row of the array of contact pads and a second row adjacent to the first row, wherein a respective exchange junction is configured to route the first signal line of a signal line pair from a first routing channel to a second different routing channel for a predetermined length, wherein routing the first signal line from the first routing channel to the second routing channel decouples the first signal line from the second signal line of the signal line pair, and wherein decoupling the first signal line from the second signal line introduces a phase shift corresponding to the predetermined length; and manufacturing the PCB based on the electrical trace layout.

13. The method claim 12, wherein determining the one or more exchange junctions comprises determining a total number of the one or more exchange junctions within the electrical trace layout.

14. The method of claim 13, wherein the total number of the one or more exchange junctions adjusts a length of coupling between the first signal line and the second signal line for each of the plurality of signal line pairs.

15. The method of claim 14, wherein increasing the total number of the one or more exchange junctions decreases the length of coupling between the first signal line and the second signal line for each of the plurality of signal line pairs.

* * * * *